United States Patent
Venolia et al.

(10) Patent No.: US 7,292,986 B1
(45) Date of Patent: Nov. 6, 2007

(54) METHOD AND APPARATUS FOR DISPLAYING SPEECH RECOGNITION PROGRESS

(75) Inventors: Daniel S. Venolia, Kirkland, WA (US); Scott D. Quinn, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/421,710

(22) Filed: Oct. 20, 1999

(51) Int. Cl.
*G10L 11/00* (2006.01)
(52) U.S. Cl. ...................................... 704/276; 704/270
(58) Field of Classification Search ................ 704/270, 704/275, 276; 345/835, 700, 808, 844, 859, 345/978, 772
See application file for complete search history.

(56) References Cited

U.S. PATENT DOCUMENTS

| | | | | |
|---|---|---|---|---|
| 5,819,225 A | * | 10/1998 | Eastwood et al. | 704/275 |
| 5,864,815 A | * | 1/1999 | Rozak et al. | 704/275 |
| 6,018,711 A | * | 1/2000 | French-St. George et al. | 704/275 |
| 6,075,534 A | * | 6/2000 | VanBuskirk et al. | 345/348 |
| 6,233,560 B1 | * | 5/2001 | Tannenbaum | 704/275 |
| 6,311,160 B1 | * | 10/2001 | Imade | 704/276 |
| 6,639,687 B1 | * | 10/2003 | Neilsen | 358/1.14 |

* cited by examiner

*Primary Examiner*—Angela Armstrong
(74) *Attorney, Agent, or Firm*—Theodore M. Magee; Westman, Champlin & Kelly, P.A.

(57) ABSTRACT

A graphical user interface provides a graphical volume meter indicating the volume of the user's speech and a speech recognition meter showing the progress of a speech recognizer. The graphical volume meter and recognition meter are both located near each other on the display such that the user can focus on both meters at the same time. One aspect of the present invention is that a speech recognition meter is placed on the display near the insertion point where the user intends their speech to take effect. Thus, the user does not have to divert their view from the insertion point in order to check the progress of the speech recognizer.

33 Claims, 23 Drawing Sheets

FIG. 5B

SUBJECT:
LOCATION:
ATTENDEES:
DURATION:
START DATE:
START TIME:
END TIME:

SUBJECT:
LOCATION:
ATTENDEES:
DURATION:
START DATE:
START TIME:
END TIME:

| | |
|---|---|
| SUBJECT: | status of alpha project — 322 |
| LOCATION: | |
| ATTENDEES: | |
| DURATION: | |
| START DATE: | |
| START TIME: | |
| END TIME: | |
| DO: | |

| | |
|---|---|
| SUBJECT: | status of alpha project — 320, 324, 322 |
| LOCATION: | |
| ATTENDEES: | |
| DURATION: | |
| START DATE: | |
| START TIME: | |
| END TIME: | |
| DO: | |

The meeting was called to order by the president and roll was taken. The minutes from the last meeting were read and approved. — 370

FIG. 9A

The meeting was called to order by the president and roll was taken. All of the members were present. The minutes from the last meeting were read and approved. — 358

FIG. 8D

The meeting was called to order by the president and roll was taken. The minutes from the last meeting were read and approved.

The meeting was called to order by the president and roll was taken. The minutes from the last meeting were read and approved.

The meeting was called to
order by the president and roll
was taken. The minutes from the
last meeting were read and
approved.

The meeting was called to
order by the president and
roll was taken. All of the
members were present.|The
minutes from the last
meeting were read and
approved.

FIG. 9E

METHOD AND APPARATUS FOR DISPLAYING SPEECH RECOGNITION PROGRESS

BACKGROUND OF THE INVENTION

The present invention relates to speech recognition. In particular, the present invention relates to graphical interfaces used in conjunction with speech recognition.

Speech recognition is currently being used in computer systems to translate spoken words into computer commands or alternatively to translate spoken words into text to appear in such things as computer generated documents, computer calendars, or e-mail messages.

Since speech recognition systems attempt to process any speech they "hear", most systems include a mechanism to activate and deactivate the recognizer so that unwanted speech is not processed. To help the user, many prior art systems include a graphical interface that indicates whether the recognizer was active or not. Other systems provide volume meters that indicate the volume of the speech signal received by the speech recognizer. To avoid obstructing the working area, these graphical interfaces appear in the corner of the active window or in a menu bar. In addition, if there are multiple meters on the display, they are separated from each other so that they can be easily read.

As a result of the positioning of the graphical interfaces, the user's attention is diverted from the insertion point where they expect their speech input to take effect. In addition, the user must look in separate areas if multiple status indicators are shown. Thus, under the prior art, the user's attention is divided from their primary task when they check on the status of the speech recognizer.

SUMMARY OF THE INVENTION

A graphical user interface provides a graphical volume meter indicating the volume of the user's speech and a speech recognition meter showing the progress of a speech recognizer. The graphical volume meter and recognition meter are both located near each other on the display such that the user can focus on both meters at the same time.

One aspect of the present invention is that a speech recognition meter is placed on the display near the insertion point where the user intends their speech to take effect. Thus, the user does not have to divert their view from the insertion point in order to check the progress of the speech recognizer.

BRIEF DESCRIPTION OF THE DRAWINGS

FIGS. 5A through 5D are selected screen images showing changes to a display associated with a progress meter of one embodiment of the present invention used with a command field.

FIGS. 6A through 6F are selected screen images showing changes to a display associated with a graphical meter of an embodiment of the present invention used with an input field.

FIGS. 7A through 7E are selected screen images showing changes to a display associated with a graphical meter of an embodiment of the present invention used with modifying text in a field.

FIGS. 8A through 8D are selected screen images showing changes to a display associated with a graphical meter of an embodiment of the present invention used with inserting text within text.

FIGS. 9A through 9E are selected screen images showing changes to a display associated with a graphical meter of an alternative embodiment of the present invention used to insert text within text.

DETAILED DESCRIPTION OF ILLUSTRATIVE EMBODIMENTS

Figure 1:
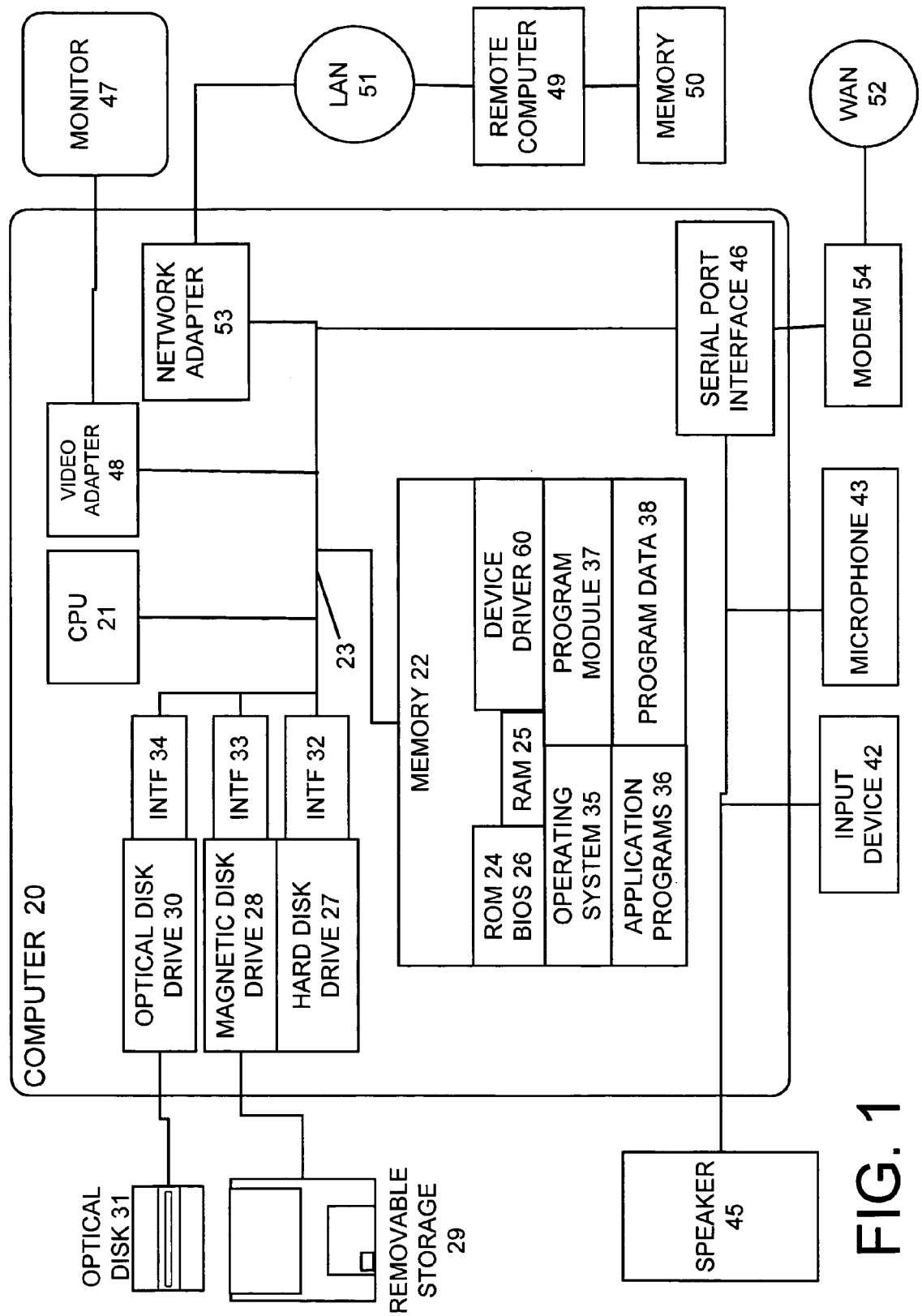
FIG. 1 is a plan view of a general computing environment in which many embodiments of the present invention may be practiced.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link, such as the link provided by LAN RF or IR, or WAN cellular technologies, may be established between one or more portions of the network.

Figure 2:
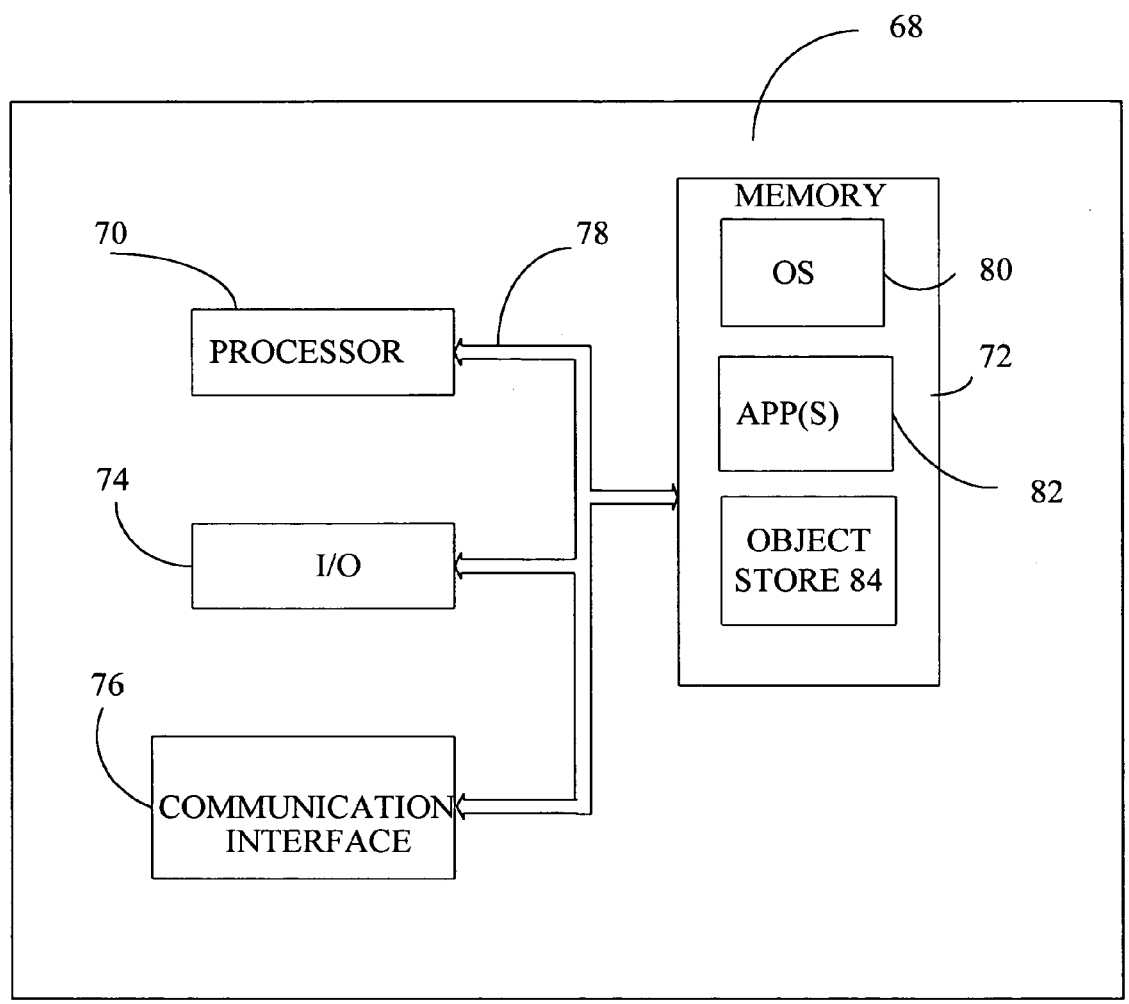
FIG. 2 is a block diagram of a mobile computing environment in which many embodiments of the present invention may be practiced.

It should be understood that the present invention could be used in other computing devices besides computer 20, discussed above. FIG. 2 is a block diagram of a mobile device 68, which is another exemplary computing environment. Mobile device 68 includes a microprocessor 70, memory 72, input/output (I/O) components 74, a communication interface 76 for communicating with, for example, computer 20. In one embodiment, the afore-mentioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disk drive.

Memory 72 includes an operating system 80, application programs 82 as well as an object store 84. During operation, operating system 80 is preferably executed by processor 70 from memory 72. Operating system 80, in one preferred embodiment, is a "WINDOWS CE" brand operating system commercially available from Microsoft Corporation. Operating system 80 is preferably designed for mobile devices, and implements database features that can be utilized by applications 82 through a set of exposed application programming interfaces and methods. The objects in object store 84 are maintained by applications 82 and operating system 80, at least partially in response to calls to the exposed application programming interfaces and methods.

Communication interface 76 represents numerous devices and technologies that allow mobile device 68 to send and receive information. The devices are similar to those discussed above with respect to computer 20 and include wired and wireless modems, satellite receivers and broadcast tuners to name a few. Mobile device 68 can also be directly connected to computer 20 to exchange data therewith. In such cases, communication interface 76 can be an infrared transceiver or a serial or parallel communication connection, all of which are capable of transmitting streaming information.

Figure 3:
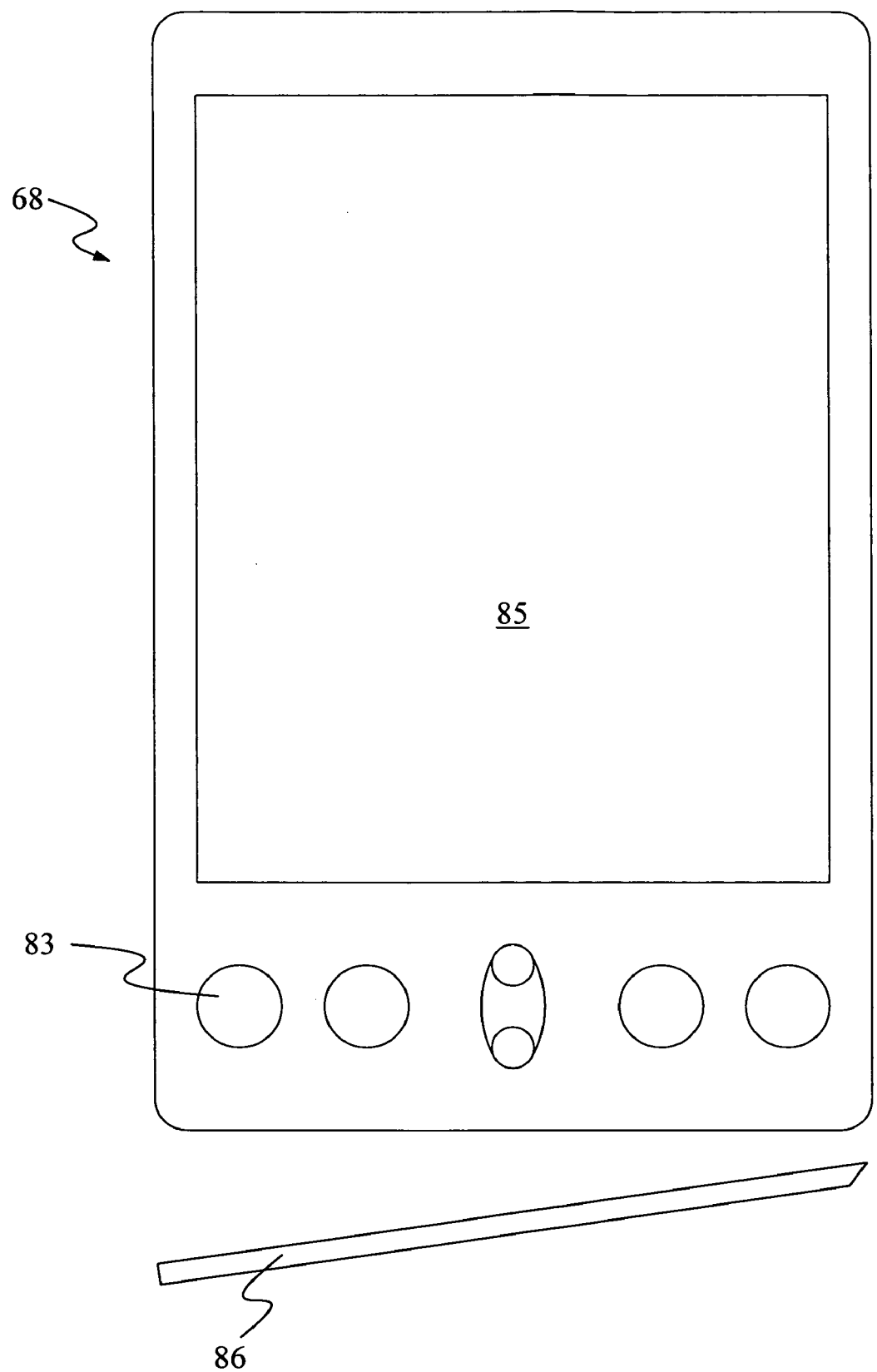
FIG. 3 is a front perspective view of a mobile computing device on which many embodiments of the present invention may be practiced.

FIG. 3 is a simplified pictorial illustration of mobile device 68. Mobile device 68 can be a desktop assistant sold under the designation H/PC or a palm-sized PC designated as P/PC having software provided by the Microsoft Corporation. In one embodiment, mobile device 68 includes a set of control buttons 83, display 85 and stylus 86. In the embodiment shown in FIG. 3, display 85 is a liquid crystal display (LCD) which uses a contact sensitive display screen in conjunction with stylus 86. Stylus 86 is used to press or contact display 85 at designated coordinates to accomplish certain user input functions. In some embodiments, a miniaturized keyboard with alpha-numeric keys is provided with the mobile device. In other known embodiments, a "soft" keyboard is provided through the contact sensitive display screen. In yet other embodiments, a character recognition module is employed to recognize characters written on the contact sensitive display screen using stylus 86.

One aspect of the present invention is a system that displays a speech input meter near the current insertion point on the display. The displayed meter has several embodiments including a microphone status indicator, a volume meter, and a recognition progress indicator. A second aspect of the invention is a system that displays a volume meter in combination with a recognition progress meter so that the user can view both meters without significantly changing their focus point on the display.

Figures 4A, 4B:
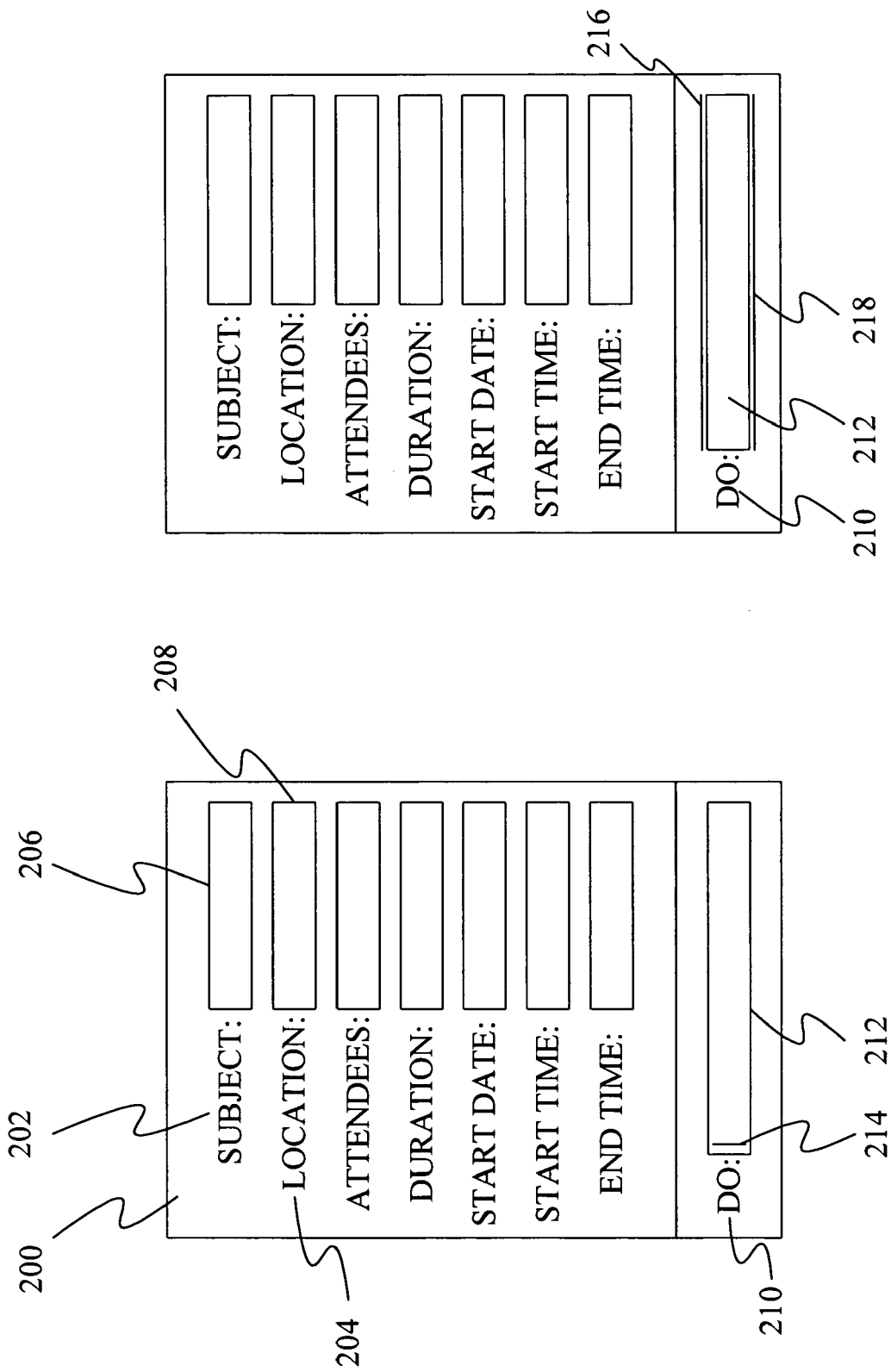
FIGS. 4A through 4J are selected screen images showing changes to a display associated with a graphical meter of one embodiment of the present invention used with a command field.

FIGS. 4A through 4J show selected screen images that depict changes in a display that are associated with a one embodiment of the present invention. In FIG. 4A, an application window 200 is shown, the contents of which are generated by an application running on a computer system. Although window 200 is shown occupying the entire screen, in some embodiments, window 200 only occupies a portion of the screen.

Window 200 includes a set of labels such as subject label 202 and location label 204 that describe the contents of a set of text boxes such as subject box 206 and location box 208. Window 200 also includes a command label denoted as "DO" label 210 and a command box 212. The user can cause text to appear in any of the text boxes or command box 212 by placing the cursor in the desired box and pressing keys on a keyboard. Alternatively, the user may enter text in the boxes by selecting virtual keys from a virtual keyboard displayed on the screen.

Users may also enter text into the text boxes or command box by giving focus to the appropriate box, activating a speech recognition application stored on the computer system, and speaking into a microphone. It is this type of text entry that is of particular interest to the present invention.

In FIG. 4A, the user has given focus to command box 212. In one embodiment, this is performed placing a stylus on command box 212. However, a keyboard, mouse, trackball or any other suitable pointing device may be used to select command box 212. In some embodiments, a cursor 214 indicates an insertion point where input text will appear on the display.

In FIG. 4B, the user has activated the speech recognition microphone so that the speech recognition system is prepared to accept input. In one embodiment, the speech recognition system is activated by holding a stylus in one position within command box 212 for longer than 200 msec. In other embodiments, the speech recognition system is activated by pressing a button on the mouse, trackball, keyboard, or the computer itself. Based on the activation of the speech recognition system, the present invention highlights the command box. In one embodiment, this highlighting appears as larger lines 216 and 218 at the top and bottom of command box 212. This change in the appearance of command box 212 indicates to the user that the speech recognition system is in a listening mode.

With the speech recognition system active, the user begins to speak into the microphone. As the user speaks, the present invention generates the display shown in FIG. 4C, which includes a volume meter 218 showing the relative volume of the user's speech over time. Note that volume meter 218 is placed within command box 212, which previously contained the stylus, cursor, or insertion point for window 200. Under many embodiments of the present invention, the volume meter occupies the entire field box if there is no text present in the field box. Under some embodiments, this general rule is not followed when the empty field box is so large or so small that the volume meter will look odd if it is sized to match the box. In such cases, a separate meter box is generated as described below. In any case, the volume meter is placed at or very near the insertion point of the active window under most embodiments of the present invention.

Figure 4D:
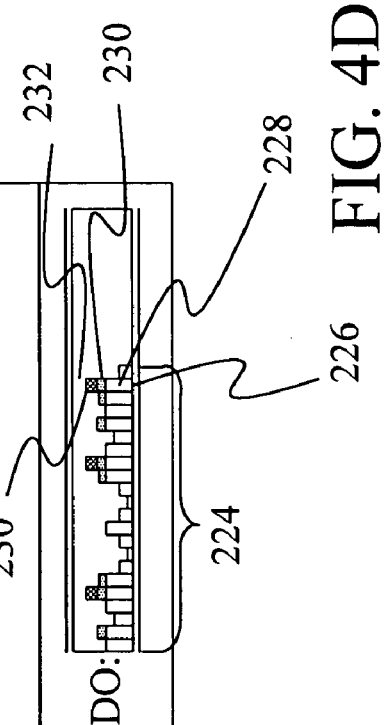
Figure 4C:
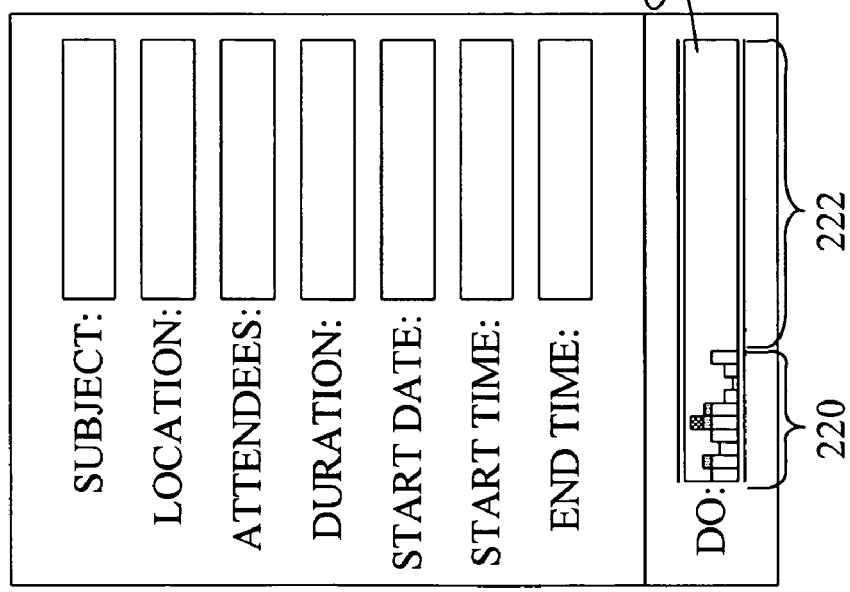
Figure 4F:
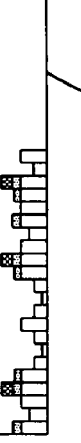

In the embodiment of FIG. 4C, volume meter 218 includes a set of tokens 220 and an empty space 222. As the user speaks, more tokens are added to the right of the existing tokens until the tokens nearly fill command box 212. This expansion can be seen by comparing the set of tokens 224 of FIG. 4D to the set of tokens 220 of FIG. 4C.

Under one embodiment of the present invention, each token consists of a lower colored portion and an upper white portion. The combined height of the colored portion and the white portion is constant while the individual heights of the colored portion and the white portion vary. Under one embodiment, the colored portion is positively related to the volume of the user's speech and the white portion is negatively related to the volume such that the colored portion is taller and the white portion is shorter when the speech signal is louder.

In some embodiments, the colored portions have different colors at different heights. In one particular embodiment, the colored portions are green up to one height, yellow up to a second height, and, if high enough, red on top. Thus, colored portions associated with low volumes are only green, colored portions associated with intermediate volumes are green and yellow, and colored portions associated with high volumes are green, yellow and red.

FIG. 4D includes a token 226 that has a green region 228, a yellow region 230, a red region 232, and a white region 233. The different colors help the user to compare the different vertical bars to each other. In addition, vertical bars with red areas indicate that the user is speaking too loudly and that their speech may be "clipped" by the microphone interface in serial port interface 46 of FIG. 1.

Figure 4E:
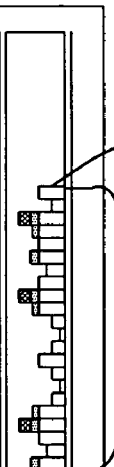
Figure 4H:

If the user continues to speak after the tokens of the volume meter near the right side of command box 212, one embodiment of the invention shifts the existing tokens to the left before adding a new token to the right. This causes the furthest left token to disappear from the display. One such shift is shown in FIG. 4E where tokens 224 of FIG. 4D have been shifted left and a new token 234 has been added to form tokens 236.

To prevent the speech recognition system from processing further speech, the user deactivates the microphone. For embodiments where the microphone was activated by placing a stylus in a command box, the microphone is deactivated by lifting the stylus. In embodiments where the microphone is activated by pressing a keyboard or mouse button, the microphone is deactivated by releasing the button. In alternative embodiments, the speech recognition system is automatically deactivated when it does not receive any speech signal for one second.

When the user deactivates the microphone, most embodiments of the present invention remove the command box highlighting. For example, in the embodiments where large lines had been put in place to indicate an active microphone, these large lines are removed. This results in smaller command box lines such as lines 240 and 242 of FIG. 4F, which indicate to the user that the microphone is no longer active.

Once the microphone is inactive, or in some embodiments, while the microphone is still active, the speech recognizer begins to process the stored speech signal. In many embodiments, the speech recognizer divides the incoming speech into frames and attempts to identify a phoneme for each frame. Typically, the earliest received frames are identified first. When the recognizer identifies a phoneme for a frame, it passes the frame's number to a display application of the present invention together with the total number of frames the recognizer is processing. If the microphone is inactive, the display application then calculates the percentage of frames that have been decoded. By multiplying this percentage by the width of the command box, the display application determines the width for a progress bar. In many embodiments, this progress bar is shown by changing the color of portions of some of the volume tokens.

Figure 4G:
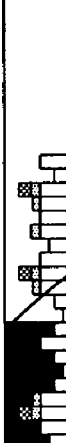

For example, FIG. 4G shows a progress bar 244 that replaces the white portions of tokens 243. Note that the colored portions of tokens 243 continue to be displayed in the command box. This allows the user to view both the volume meter and the recognizer progress bar at the same time.

As the recognizer decodes more frames, the recognizer progress bar moves to the right in the command box. Thus, in FIG. 4H progress bar 244 extends further to the right then it did in FIG. 4G. When all of the frames are decoded, as shown in FIG. 4I, progress bar 244 extends to the last token in the volume meter.

Figures 4I, 4J:
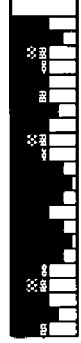

In the embodiment of FIGS. 4A through 4J, the input speech signal is a command for the computer system. As such, the system can either execute the command directly or display the command in command box 212 as shown in FIG. 4J.

Figure 5D:
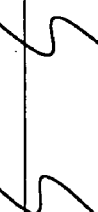

In other embodiments, a recognition progress indicator is provided without showing a volume meter. An example of a series of displays generated by such an embodiment is shown in FIGS. 5A through 5D. In FIG. 5A, the user has given focus to a command box 272. In FIG. 5B, the user has activated the microphone for the speech recognition system. In response, the command box has been highlighted by placing larger lines 274 and 276 at the top and bottom of command box 272. This change in the appearance of command box 272 indicates to the user that the speech recognition system is in a listening mode.

Figure 5C:

In FIG. 5C, the user has finished speaking and has deactivated the microphone. In response, the highlighting on the command box has been removed by removing larger lines 274 and 276 and restoring the command box to its original appearance. Note that while the user was speaking, the embodiment of FIGS. 5A through 5D did not display a volume meter.

When the user deactivates the microphone, or in some embodiments while the microphone is active, the speech recognizer begins processing the speech signal. To show the progress of the recognizer, a progress bar 278 is displayed in command box 272 after the user deactivates the microphone. Progress bar 278 starts from the left side of command box 272 and expands to the right as the recognizer decodes frames of the speech signal. In one embodiment, the width of progress bar 278 is set equal to the width of command box 272 multiplied by the percentage of speech frames decoded by the recognizer.

Figures 6A, 6B:
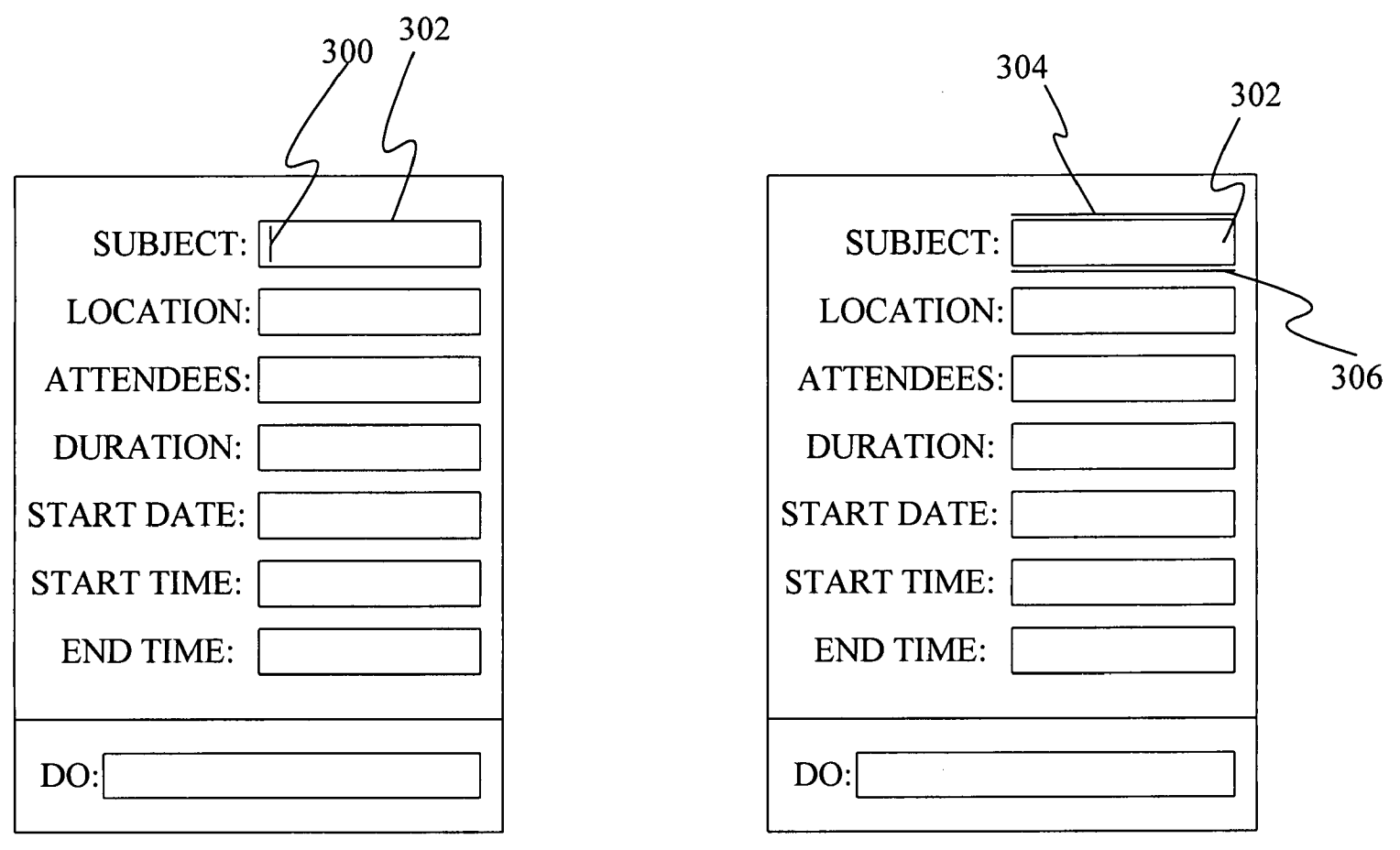
Figure 6D:
Figure 6C:

In other embodiments of the invention, the progress meter and the volume meter are displayed in a data field rather than a command box. FIGS. 6A through 6F show selected screens generated by such embodiments. In FIG. 6A, the user has placed insertion point 300 in an empty data field 302, which is part of an appointment form. In FIG. 6B, the user has activated the microphone causing the field to be highlighted such that lines 304 and 306 appear around data field 302. With the microphone active, the user's speech is collected by the speech recognizer. As it receives the speech signal, the recognizer generates a set of volume values, which are used to generate a volume meter 308 shown in FIG. 6C. The volume meter of FIG. 6C is similar to the meter of FIGS. 4C through 4E described above.

Figures 6E, 6F:
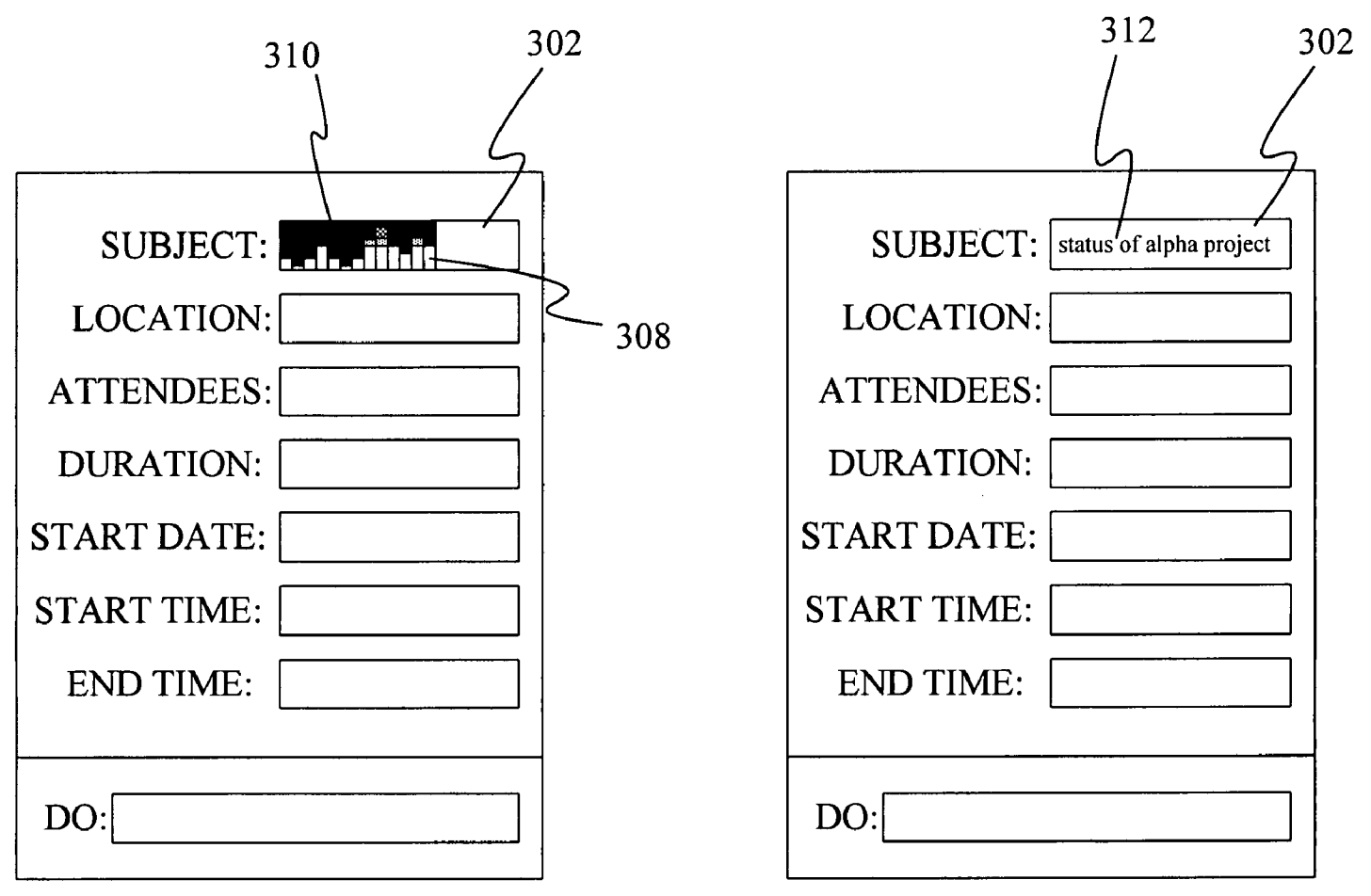

When the user deactivates the microphone, the highlighting on the data field is removed by removing lines 304 and 306 from the edges of data field 302 as shown in FIG. 6D.

A recognizer progress bar 310 is then displayed so that the bar expands from the left as the recognizer decodes frames of the speech signal. Progress bar 310 is similar to progress bar 244 of FIG. 4G. When all of the speech frames have been decoded, volume meter 308 and progress bar 310 are replaced with displayed text 312, which represents the text decoded from the speech signal. The displayed text is then used by the application as the user's input for data field 302. For example, display text 312 represents the user's input for the "subject" of their appointment.

Figures 7C, 7D:
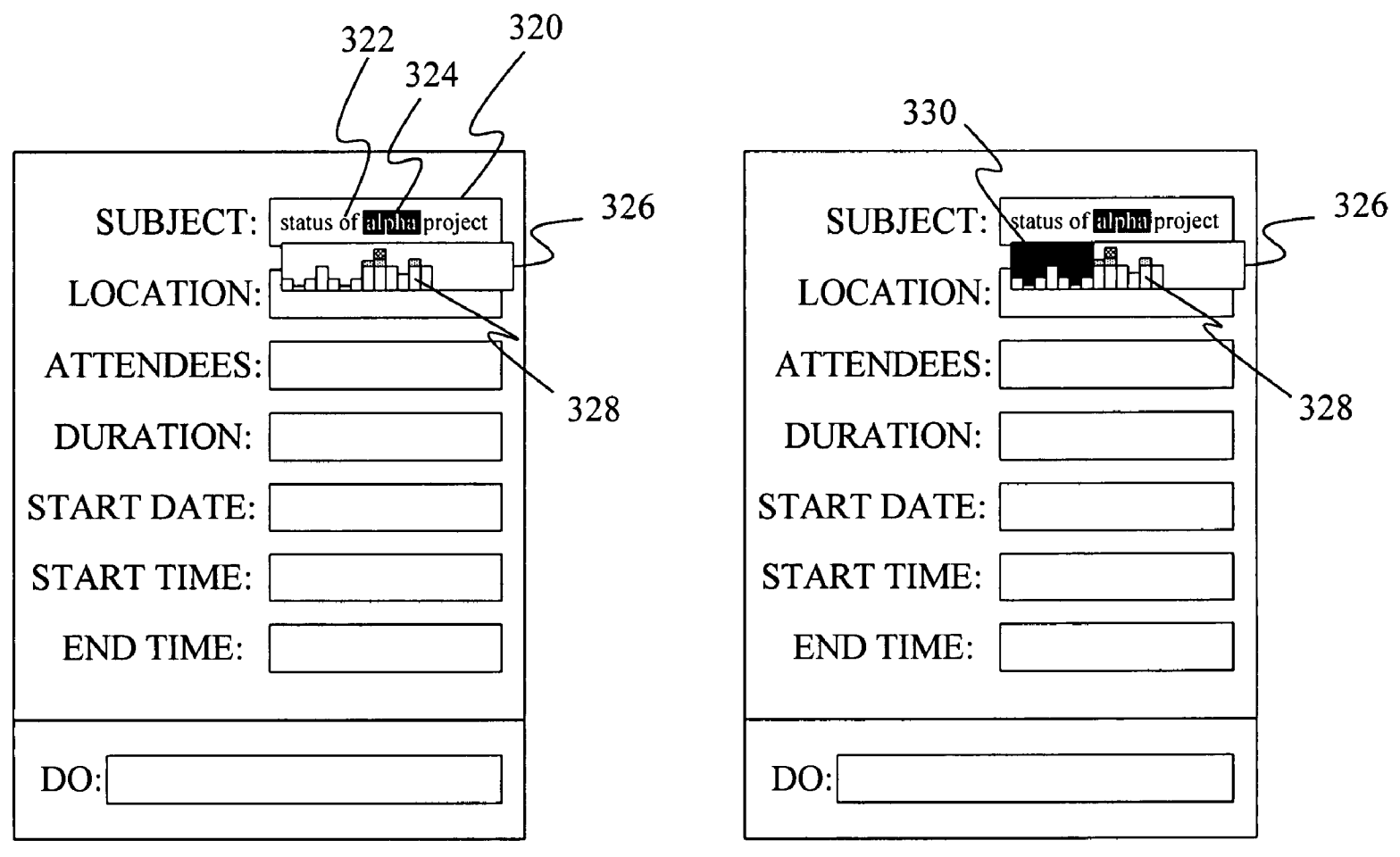

Embodiments of the present invention also provide a volume meter and progress meter for speech designed to replace highlighted text on a display. FIGS. 7A through 7E show selected displays produced by such embodiments. In FIG. 7A, a data field 320 contains displayed text 322. In FIG. 7B, the user has highlighted a word 324 in displayed text 322 by, for example, "clicking" on the word or "dragging" the cursor over the word.

In FIG. 7C, the user has activated the microphone causing a meter box 326 to appear below highlighted word 324. As the user speaks, meter box 326 is filled with a volume meter 328 similar to volume meter 218 of FIG. 7D. When the user finishes speaking and deactivates the microphone, a black recognizer progress bar 330 is displayed in meter box 326 by selectively changing the color of the white areas of volume meter 328. Progress bar 130 expands to the right in proportion to the percentage of frames that the recognizer has decoded. FIG. 7D shows one screen image during this progression. When all of the frames have been decoded, meter box 326 is removed from the display and the highlighted word is replaced by a decoded word(s) 332 from the speech recognizer.

Figures 7E, 8A:
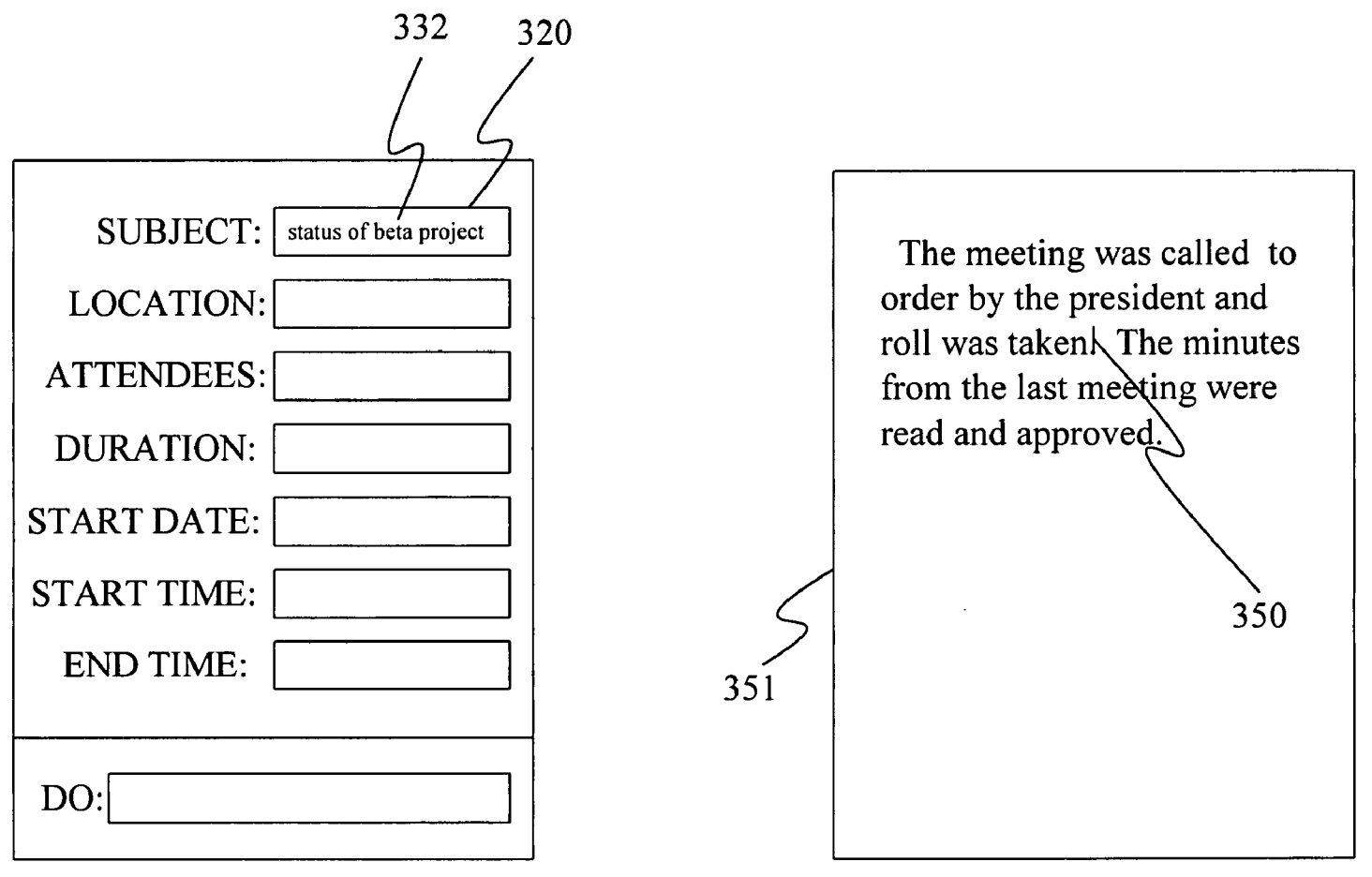
Figure 8C:
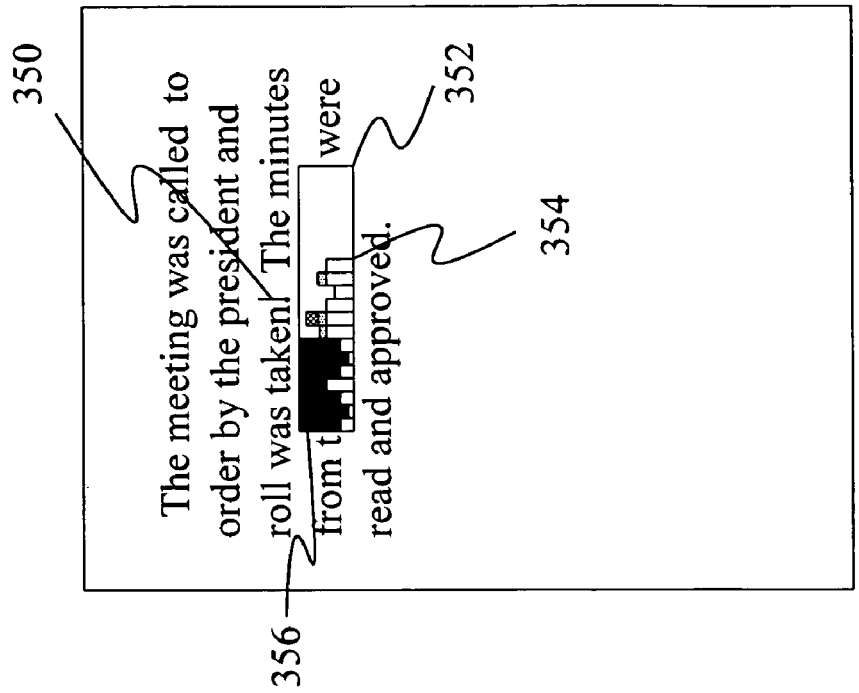
Figure 8B:
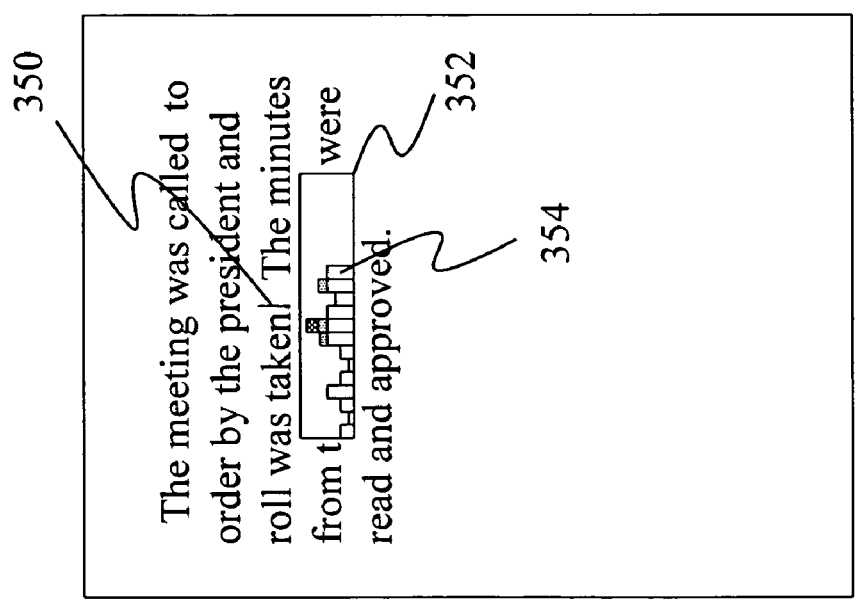

Embodiments of the present invention also provide a volume meter and progress indicator for speech that is to be inserted in the middle of text. FIGS. 8A through 8D show selected images from a display produced by one such embodiment. In FIG. 8A, the user has placed an insertion point 350 between two characters in a field 351.

In FIG. 9B, the user has activated the microphone and begun speaking. In response, a meter box 352 is displayed below insertion point 350. In one embodiment, the height of meter box 352 is chosen to match the font size of the characters to the left of the insertion point. As the user speaks, a volume meter 354 appears in meter box 352. When the user finishes speaking, a progress bar 356 appears in meter box 352 as shown in FIG. 8C. Volume meter 354 and progress bar 356 are similar to volume meter 218 and progress bar 244 described above. Progress bar 356 expands to the right over time to show the progress of the speech recognizer. When the speech recognizer has decoded all of the frames of the speech signal, meter box 352 is removed and text 358, which was decoded from the speech signal, is inserted at insertion point 350. In some embodiments, the insertion point is then moved to the end of inserted text 358. Note that any text after insertion point 350 "reflows" to accommodate text 358. A description of such text reflow is described further below.

In other embodiments of the invention in which speech is to be inserted within existing text, the meter box is placed within the text instead of below the text. FIGS. 9A through 9E show selected images of a display generated by one such embodiment. In FIG. 9A, the user has placed an insertion point 370 between two displayed text characters. In FIG. 9B, the user has activated the microphone and begun to speak. In response, a volume meter 374 has been inserted at insertion point 370.

When volume meter box 374 is inserted into the display, the text beyond insertion point 370 "reflows" to accommodate the volume meter. In other words, the text on the same line as volume meter 374 initially scrolls right. During this scrolling, if a word on the right end of the line exceeds the right margin, the word is removed from the line and placed on the far-left of the next line. To accommodate the insertion of this word on the next line, the words of the next line are also scrolled to the right. This continues until the last line of the current paragraph is reached. When scrolling causes a word to exceed the right margin of the last line of a paragraph, a new line is added below the last line and the word is moved to the left side of the new line.

In one embodiment, volume meter 374 is assigned a fixed width. In other embodiments, the width of volume meter 374 continues to increase as long as the microphone is active and the user continues to speak. In such embodiments, when the volume meter reaches the right side of the display, the meter is continued on the next line of text. An example of such an embodiment is shown in FIG. 9C where the user has spoken long enough that volume meter 374 extends over two lines. The maximum height of the bars in volume meter 374 is generally fixed and can be selected as desired. For instance, in one embodiment, the maximum height is the line height of the font of the character to the left of the volume meter.

In FIG. 9D, a progress bar 376 is added to volume meter 374 to indicate the progress of the speech recognizer in decoding the speech signal. In some embodiments where volume meter 374 extends over more than one line, progress bar 376 expands to the edge of the volume meter on the current line then continues to expand on the next line of the volume meter. When the recognizer has decoded the entire speech signal, volume meter 374 and progress bar 376 are removed from the display and text 377 decoded from the speech signal is inserted at insertion point 370 as shown in FIG. 9E.

Although the volume meters and progress indicators described above are all shown as rectangular boxes, other shapes are possible under other embodiments of the invention. For example, the volume meter and the progress indicator can be shown along the radius of a circle or can be shown by changing the size or color of a displayed object on the screen. In addition, although the volume meter and progress indicator are shown above as expanding from left to right, they can alternatively expand from top to bottom, bottom to top, right to left, or diagonally. Furthermore, although the progress indicator has been shown as replacing the white areas of the volume meter, in other embodiments of the invention, the progress indicator is fully separated from the volume meter. Any colors mentioned above for the volume meter or the progress indicator are merely illustrative and other colors may be substituted within the scope of the invention.

Figure 10:
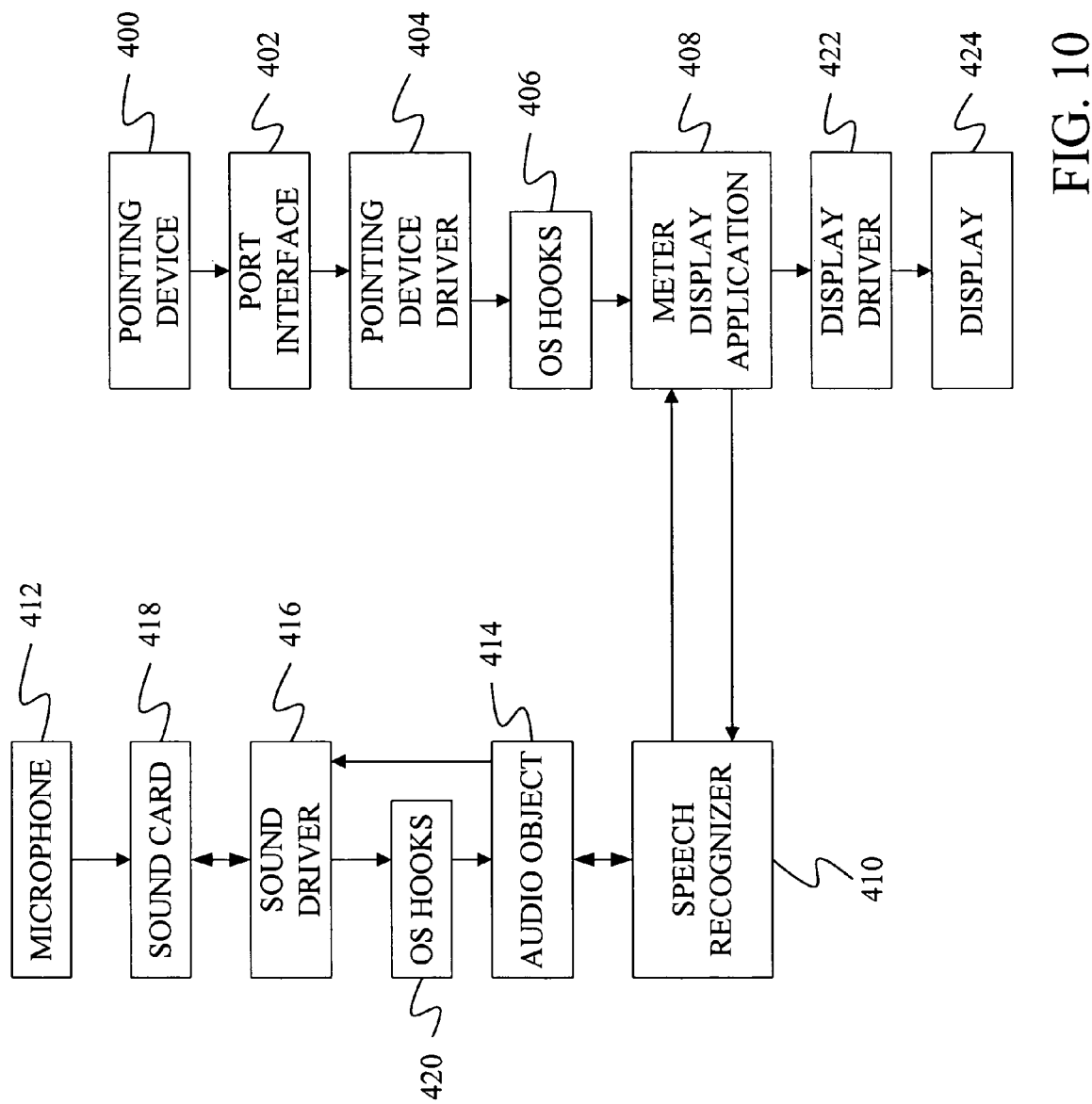
FIG. 10 is a block diagram showing components of a speech recognition and display system of an embodiment of the present invention.

FIG. 10 provides a block diagram of hardware and software components that are used by one embodiment of the present invention to produce the displays discussed above. In FIG. 10, the user manipulates a pointing device 400 to indicate that they wish to activate the microphone. Pointing device 400 can be any number of pointing devices such as a mouse, a track ball, or a stylus. Input signals from pointing device 400 pass through a port interface 402, which converts the signals into a suitable format for a pointing device driver 404. For example, port interface 402 can include a serial-to-parallel converter that converts a serial input signal from pointing device 400 into a series of parallel values that are provided to device driver 404.

Device driver 404 converts the input signals it receives into one or more pointing device messages, which are routed to an operating system message hook procedure 406. The operating system maintains a list of applications that are to receive pointing device messages when they are generated. Based on that list, message hook procedure 406 routes the pointing device messages to meter display application 408.

Based on the received device messages, meter display application 408 is able to determine that the user wants to activate the speech recognition system. In one embodiment, this determination is made by measuring the length of time the user maintains a stylus in contact with one area of a touch screen.

When meter display application 408 determines that the user wants to activate the speech recognition system, it communicates this information to a speech recognizer application 410. In one embodiment, this communication is performed using an Application Programming Interface (API). Speech recognizer application 410 includes a number of sub-modules (not shown for clarity) that together are capable of decoding a speech signal into text. A number of such speech recognizers are available such as Microsoft Continuous Speech Recognition Engine from Microsoft Corporation of Redmond, Wash.

Before it can begin to decode the speech signal, speech recognizer 410 must activate a microphone 412. In the embodiment of FIG. 10, this is done indirectly through an audio object 414, which is an abstraction of a number of different possible audio inputs. For example, audio object 414 can act as an interface to an audio file, a telephone line, or in this case, a microphone. By presenting a single abstraction to speech recognizer 410, audio object 414 simplifies the design of speech recognizer 410 and creates a portable object that can be used in other contexts.

Audio object 414 communicates with a sound driver 416, which interacts with a sound card 418. Sound card 418 is typically a hardware device inside a personal computer that includes one or more external ports. Under one embodiment of the present invention, sound card 418 is connected to microphone 412. In response to a call from audio object 414, sound driver 416 causes sound card 418 to open a communication path to microphone 412.

With microphone 412 active, audio signals such as speech are converted into electrical signals by microphone 412 and are passed to sound card 418. Sound card 418 includes an analog-to-digital converter that converts the analog electrical signals into a series of digital values. These digital values are then passed to sound driver 416, which collects the digital signals to form microphone messages.

In embodiments that utilize an operating system such as Windows 95®, Windows 98®, or Windows NT® from Microsoft Corporation of Redmond Wash., the microphone messages are routed to a message hook procedure 420, which forms part of the operating system. Message hook procedure 420 maintains a list of applications that want to receive microphone messages when they are generated. In such embodiments, audio object 414 registers with message hook procedure 420 so that it receives microphone messages from sound driver 416.

Upon receiving a microphone message from message hook procedure 420, audio object 414 collects the microphone data contained in the message in a temporary buffer. Audio object 414 then provides speech recognizer 410 with a pointer to the temporary buffer so that speech recognizer 410 can access the speech values.

Using the pointer, speech recognizer 410 accesses the speech values in order to generate a set of volume values that are passed to meter display application 408. In one embodiment, sound card 418 generates 16 kilobytes of speech data per second. Each byte of data represents the magnitude or volume of the speech signal during a respective fraction of a second. Although the volume of the user's speech is represented directly by the sound card's data, most embodiments of the invention do not base the volume meter directly on this data. Instead, an average volume is determined from the sound card data. In particular, for many embodiments of the invention, speech recognizer 410 generates an average volume value from the samples created from a tenth of a second of speech.

The average volume values generated by speech recognizer 410 are used to produce the volume meters described above. One process for converting the values into the displayed meter is shown in the flow diagram of FIG. 11.

Figure 11:
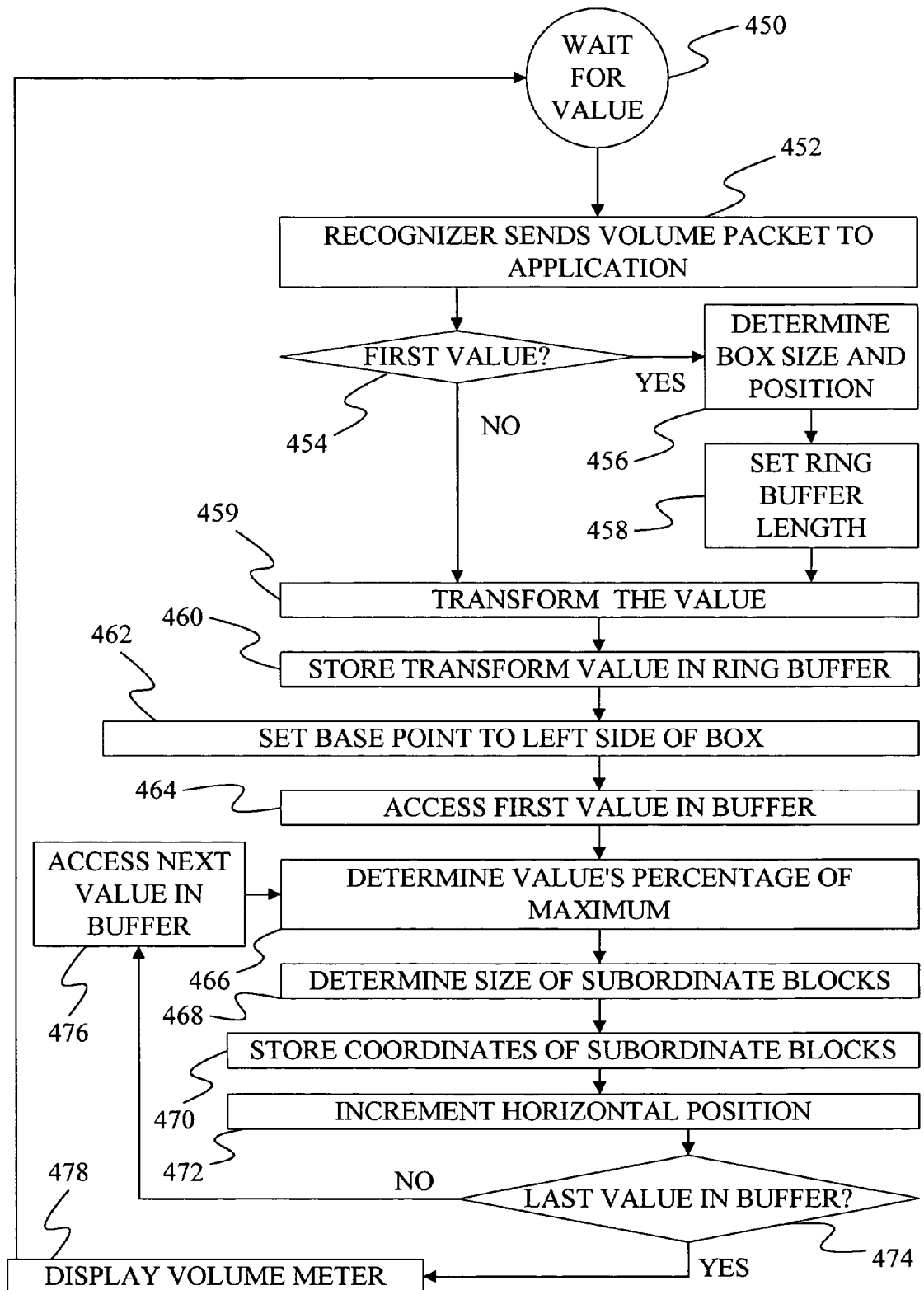
FIG. 11 is a flow diagram showing a method of generating a volume meter under an embodiment of the present invention.

The process of FIG. 11 begins at step 450 where meter display application 408 waits for the next volume value. At step 452, speech recognizer 410 sends a volume value to display application 408. In one embodiment, this is performed using a callback procedure. At step 454, display application 408 determines if this is the first volume value since the microphone was activated. If this is the first value, the process continues at step 456 where display application 408 determines the meter box size and position.

As shown above, the meter box can have many different sizes and positions. In particular, the meter box can replace an entire field box, be positioned within a larger field box, be positioned below an insertion point or be positioned at an insertion point. Typically, the height of the meter box is chosen to match the font of the text near the box. The width of the box is chosen by balancing a desire to make the meter easy to see with a desire to limit the amount of previously displayed data that is obscured by the meter.

Once the size and position of the meter box has been determined, the process continues at step 458 where display application 408 sets the length of a ring buffer based on the size of the meter box. The ring buffer is designed to hold enough values to fill a desired portion of the meter box with volume tokens. Thus, the size of the ring buffer is determined by multiplying the width of the meter box by a proportion constant that indicates the amount of the meter box to be filled and dividing the result by the width of each volume token to be inserted in the meter box. For example, if the meter box is 100 pixels wide, each volume token is three pixels wide and only ninety percent of the meter box is to be used, the ring buffer should be large enough to hold thirty values (100 times 0.9 divided by 3).

Once the buffer length is set, or if this is not the first value at step 454, the process continues at step 459 where the value is transformed. This transformation is used by some embodiments of the present invention to provide a more descriptive image of the volume. In particular, the transformation reduces the scale between the largest volume and the smallest volume so that the displayed meter is not comprised of only full volume values and zero volume values. In one embodiment, the transform involves taking the logarithm of the volume value. In another embodiment, the transform involves taking the square root of the volume value.

Once the transform has been determined for the value, the transformed valued is stored in the ring buffer at step 460. If the ring buffer already contains values, these values are shifted within the ring buffer before the new value is added. If the ring buffer is full, the oldest value is removed by this shifting.

Once the value has been added to the ring buffer, the process continues at step 462 where display application 408 prepares to create the first volume token for the meter box. As part of this preparation, display application 408 sets a base point so that it is equal to the bottom-left corner of the meter box. This base point represents the location for the first volume token in the meter box. With the base point set, display application 408 then retrieves the first value from the ring buffer at step 464.

At step 466, display application 408 determines the ratio of the retrieved value to a maximum allowed value. At step 468, display application 408 uses this ratio to determine the size and location of the subordinate blocks that form the volume token. This determination is used to "draw" the subordinate blocks on the display by storing the block's coordinates, which are later accessed by a display driver to create an image on a display.

The size and location of the subordinate blocks is determined sequentially by first determining the height of a base rectangle. In many embodiments, this base rectangle has a green color on the display. The height of the base rectangle is equal to the height of the meter box times the lesser of a maximum height ratio for the base rectangle and the volume ratio of the retrieved value. The maximum ratio sets a limit for the height of the base rectangle. If the volume ratio is less than the maximum height ratio of the base rectangle, the height of the base rectangle is set equal to the height of the meter box times the volume ratio. In addition, since the volume value is not large enough to require a full base rectangle, a white rectangle is drawn from the top of the base rectangle to the top of the meter box. Thus, the volume token for a small volume value only has two subordinate blocks.

If the volume ratio is greater than the maximum height ratio of the base rectangle, the volume ratio is compared to a maximum height ratio of an intermediate block. If the volume ratio is less than the maximum height ratio of the intermediate block, the maximum height ratio of the base rectangle is subtracted from the volume ratio to determine an excess ratio. The excess ratio is then multiplied by the total box height to determine the height of the intermediate rectangle. This rectangle is then drawn on top of the base rectangle and is typically colored yellow. A white rectangle is then drawn from the top of the intermediate rectangle to the top of the meter box.

If the volume ratio is greater than the maximum height ratio of the intermediate rectangle, the height of the intermediate rectangle is equal to the height of the meter box times the difference between the maximum height ratio of the intermediate rectangle and the maximum height ratio of the base rectangle. The intermediate rectangle is then drawn on top of the base rectangle. The volume ratio is then compared to the maximum height ratio of a top rectangle. If the volume ratio is greater than the maximum height ratio of the top rectangle, the height of the top rectangle is equal to the height of the meter box times the difference between the maximum height ratio of the top rectangle and the maximum height ratio of the intermediate rectangle.

If the volume ratio less than the maximum height ratio for the top rectangle, the height of the top rectangle is equal to the height of the meter box times the difference between the volume ratio and the maximum height ratio of the intermediate rectangle.

Once the height of the top rectangle has been determined, the top rectangle is drawn above the intermediate rectangle and a white rectangle is drawn above the top rectangle. Typically, the top rectangle is colored red.

With the coordinates of each rectangle in the current volume token stored, the process continues at step 472, where the base point is incremented by one volume token width to the right. This variable sets the bottom-left-most coordinates of the base rectangle for the next volume token.

At step 474, display application 408 determines if this was the last value in the ring buffer. If this was not the last value, display application 408 accesses the next value in the ring buffer at step 476 and repeats steps 466, 468, 470, 472, and 474. If this was the last value in the ring buffer, display application 408 indicates to display driver 422 that the display of the volume meter should be updated at step 478. Display driver 422 then displays the volume meter based on the data stored by display application 474. After step 478, display application 408 returns to step 450 to await a new volume value from speech recognizer 410.

In one embodiment, speech recognizer 410 begins to decode the speech data when the microphone is deactivated. The microphone can be deactivated by the user by using pointing device 400 or by audio object 414 if the audio object detects a long enough pause in the user's speech. For some embodiments where pointing device 400 is a stylus, the user deactivates the microphone by lifting the stylus from the touch screen. As with activating the microphone, the deactivation message from the pointing device is passed through device driver 404, message hook procedures 406, display application 408, speech recognizer 410, audio object 414, and sound driver 416 before it arrives at sound card 418.

Speech recognizer 410 typically decodes the speech data by converting "frames" of the speech data into sub-word units such as phonemes or triphones. In most cases, a frame consists of 10 milliseconds worth of speech data, which is converted into the frequency domain before being compared to a set of acoustic and language models. These models provide a probability that a particular sub-word unit was uttered given the speech data. In some cases, a detector trellis is used which identifies a most likely sequence of sub-words given the speech data and the probabilities from the models. In such a detector trellis, unlikely sequences or paths are removed from consideration. As this pruning is performed, all but one sub-word is removed from consideration for at least one past frame. This sub-word is then identified as the decoded sub-word for the frame.

Figure 12:
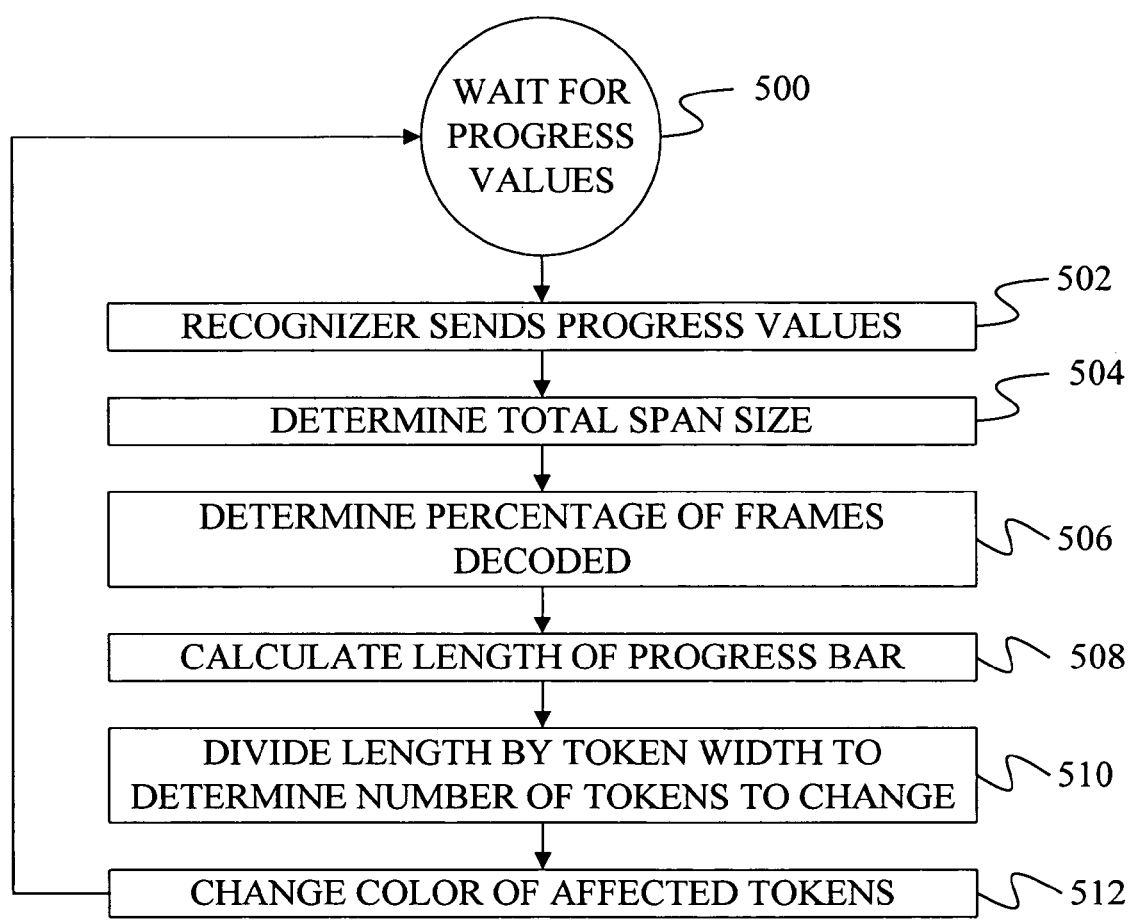
FIG. 12 is a flow diagram showing a method of generating a progress meter under an embodiment of the present invention.

As shown above, the present invention provides a progress meter to allow the user to monitor the progress of the speech recognizer. FIG. 12 provides a flow diagram of a method for generating this meter under one embodiment of the present invention.

In a first step 500 of FIG. 12, display application 408 waits for a progress message from speech recognizer 410. At step 502, speech recognizer 410 decodes a sub-word unit for a frame and invokes a callback procedure to send a message to display application 408. In the message, speech recognizer 410 indicates the total number of frames to be decoded and the frame number of the last frame that was decoded.

When display application 408 receives the frame message from speech recognizer 410, it determines the maximum span size, or width, for the progress meter at step 504. In some embodiments, the maximum width is the width of the meter box. In other embodiments the maximum width is the width of the volume meter displayed in the meter box.

At step 506, display application 408 determines the percentage of frames that have been decoded by dividing the total number of speech frames by the frame number of the last decoded frame. At step 508, display application 408 multiplies this percentage by the maximum span of the progress meter to determine the length of the progress meter to be displayed.

At step 510, display application 408 divides the width calculated in step 508 by the width of an individual volume token in the volume meter to determine the number of white rectangles that must be changed to black. At step 512, display application 408 changes the color of the white rectangles identified in step 510. The progress meter is then displayed again by display driver 422 and display 424. The process then returns to step 500, where display application 408 waits for the next progress message.

Although the progress meter described above is implemented by changing the color of the white rectangles of the volume tokens, other implementations are within the scope of the invention. In particular, the progress meter can be implemented by changing the color of any of the colored rectangles of the volume tokens or by changing the color of a portion of the screen that is separate from the volume tokens.

Although the present invention has been described with reference to particular embodiments, workers skilled in the art will recognize that changes may be made in form and detail without departing from the spirit and scope of the invention.

What is claimed is:

1. A method in a computer system for generating images on a display device, the method comprising:
   displaying an insertion marker at an insertion area on a display, the insertion area representing the location at which the user desires to provide input; and
   displaying a progress meter so that at least a portion of the progress meter is less than the height of one text line away from the insertion area based on the location of the insertion marker, the progress meter quantitatively indicative of the amount of progress in decoding a speech input.

2. The method of claim 1 further comprising:
   receiving input from the user indicating that a microphone is to be activated;
   activating the microphone; and
   displaying an indication that the microphone is active near the progress meter.

3. The method of claim 1 further comprising:
   converting a user's speech input into an analog speech signal;
   converting the analog speech signal into at least one digital speech value; and
   transforming the at least one digital speech value into coordinates for at least one shape on the display positioned near the progress meter.

4. The method of claim 3 wherein transforming the at least one digital speech value into coordinates comprises:
   applying a mathematical function to the at least one digital speech value to produce a transform value, the range between the lowest possible transform value and the highest possible transform value being less than the range between the lowest possible digital speech value and the highest possible speech value; and
   using the transform value to identify coordinates for the at least one shape on the display.

5. The method of claim 4 wherein applying a mathematical function comprises taking the logarithm of at least one digital value.

6. The method of claim 4 wherein applying a mathematical function comprises taking the square-root of at least one digital value.

7. The method of claim 4 wherein the shape is a base rectangle and wherein using the transform value to determine the coordinates of the base rectangle comprises:

determining a base point for the base rectangle on the display;
accessing a stored rectangle width;
accessing a maximum transform value;
dividing the transform value by the maximum transform value to produce a transform ratio;
determining a calculated height based in part on the transform ratio; and
calculating the coordinates of the base rectangle based on the base point, the stored rectangle width and the calculated height.

8. The method of claim 7 wherein determining a calculated height comprises determining if the transform ratio is greater than a maximum height ratio for the base rectangle and if it is, performing a further step of multiplying the maximum height ratio for the base rectangle by a full meter height to produce the calculated height.

9. The method of claim 8 further comprising steps of:
subtracting the maximum height ratio for the base rectangle from the transform ratio to produce an excess ratio;
determining a second rectangle height based in part on the excess ratio; and
calculating the coordinates of a second rectangle based on the coordinates of the base rectangle, the stored rectangle width and the second rectangle height, the coordinates of the base rectangle and the second rectangle such that the second rectangle appears connected to a top edge of the base rectangle on the display.

10. The method of claim 9 wherein determining a second rectangle height comprises determining if the excess ratio is greater than a maximum height ratio for the second rectangle and if it is, performing a further step of multiplying the maximum height ratio for the second rectangle by the full meter height to produce the second rectangle height.

11. The method of claim 10 further comprising steps of:
subtracting the maximum height ratio for the second rectangle from the excess ratio to produce a remainder ratio;
determining a third rectangle height by multiplying the remainder ratio by the full meter height; and
calculating the coordinates of a third rectangle based on the coordinates of the second rectangle, the stored rectangle width and the third rectangle height, the coordinates of the second rectangle and the third rectangle such that the third rectangle appears connected to a top edge of the second rectangle on the display.

12. The method of claim 7 further comprising calculating the coordinates of a background rectangle, the background rectangle appearing between the base rectangle and a point at a full meter height above a bottom edge of the base rectangle.

13. The method of claim 12 further comprising:
dividing the speech input into frames;
decoding at least one of the frames of speech into a sub-word unit;
dividing a frame number of the last frame to be decoded by the total number of frames to produce a decode ratio; and
displaying the progress meter based on the decode ratio by changing the color of at least one background rectangle.

14. The method of claim 13 wherein displaying the progress meter comprises:
multiplying the decode ratio by a full meter width to produce a progress width;
dividing the progress width by a rectangle width that is indicative of the width of each background rectangle, the division producing a rectangle count; and
changing the color of a number of background rectangles, the number of background rectangles being equal to the rectangle count.

15. The method of claim 1 wherein displaying a progress meter further comprises:
dividing the speech input into frames;
decoding at least one of the frames of speech into a sub-word unit;
dividing a frame number of the last frame to be decoded by the total number of frames to produce a decode ratio; and
displaying the progress meter based on the decode ratio.

16. The method of claim 15 wherein displaying the progress meter further comprises:
multiplying the decode ratio by a full meter width to determine a progress width; and
calculating the coordinates of a progress rectangle based on the progress width, a stored meter height and a base point on the display.

17. A computer-readable medium having stored thereon computer-executable instructions comprising:
insertion point marker instructions capable of maintaining the coordinates of an insertion point on a display, the insertion point representing a location on the display where a user desires to provide input;
speech recognition instructions capable of decoding a speech signal; and
meter generation instructions capable of displaying a meter within one text line of the insertion point based on the insertion point marker, the meter being indicative of an amount of a speech signal that has been decoded by the speech recognition instructions.

18. The computer-readable medium of claim 17 wherein the meter generation instructions further comprise:
a microphone state variable having a value that is indicative of whether a microphone is active; and
active microphone display instructions, capable of displaying an indication that the microphone is active near the insertion point.

19. The computer-readable medium of claim 17 wherein the meter generation instructions further comprise transform instructions capable of transforming a digital value into a set of coordinates for a shape on the display, the digital value being indicative of the magnitude of a portion of a speech signal.

20. The computer-readable medium of claim 17 wherein the speech recognition instructions are capable of decoding a speech signal into a set of sub-words.

21. A method in a computer system for generating images on a display device, the method comprising:
receiving a speech input signal that is indicative of human speech;
displaying a volume meter that is indicative of the magnitude of at least a portion of the speech input signal; and
displaying a progress meter on the display so that a user can perceive both the progress meter and the volume meter without moving their eyes, the progress meter quantitatively indicating the amount of progress of a speech recognition system in decoding the speech input signal.

22. The method of claim 21 wherein displaying a volume meter comprises:

storing digital values representing the magnitudes of different respective portions of the speech signal;

accessing the stored digital values;

displaying a separate token for each separate digital value that is accessed.

23. The method of claim 22 wherein displaying a separate token comprises:

displaying a meter portion of the token, the meter portion's size being positively related to the magnitude of the speech signal such that higher magnitude portions of the speech signal have larger meter portions; and displaying a background portion of the token, the background portion's size being negatively related to the magnitude of the speech signal such that higher magnitude portions of the speech signal have smaller background portions.

24. The method of claim 23 wherein displaying the meter portion comprises:

transforming a digital value representing the magnitude of a portion of the speech signal to produce a transform value, the range between the smallest and largest transform value being less than the range between the smallest and largest digital value;

dividing the transform value by a maximum meter value to produce a meter ratio; and determining the height of at least a portion of the meter portion using the meter ratio and a full meter height.

25. The method of claim 24 wherein determining the height of at least a portion of the meter portion comprises multiplying the meter ratio by the full meter height.

26. The method of claim 24 wherein determining the height of at least a portion of the meter portion comprises:

determining if the meter ratio is greater than a base ratio and if the meter ratio is greater than the base ratio performing steps comprising:

multiplying the base ratio by the full meter height to determine the height of a base block of the meter portion;

subtracting the base ratio from the meter ratio to produce an excess ratio;

using the excess ratio and the full meter height to determine a height of a second block of the meter portion.

27. The method of claim 26 wherein using the excess ratio and the full meter height to determine a height of a second block comprises:

determining if the excess ratio exceeds an intermediate ratio and if the excess ratio exceeds the intermediate ratio performing steps comprising:

multiplying the intermediate ratio by the full meter height to produce the height of the second block;

subtracting the intermediate ratio from the excess ratio to produce a remainder ratio; and multiplying the remainder ratio by the full meter height to produce a height for a top block of the meter portion.

28. The method of claim 24 wherein the speech recognizer decodes the speech input signal by converting frames of the speech input signal into sub-words and wherein displaying a token comprises:

dividing the number of the last frame decoded by the speech recognizer by a total number of frames that form the speech input signal to produce a progress ratio;

multiplying the progress ratio by a full meter width to produce a progress width;

dividing the progress width by a token width to produce an affected number of tokens; and for each of the affected number of tokens, setting the color of at least a portion of each token so that it is different from the color of other tokens.

29. A computer-readable medium having stored thereon computer-executable instructions designed to be executed in a computer system having a display, the computer-executable instructions comprising:

a volume meter portion capable of displaying a volume meter on the display that is indicative of the volume of a human speech signal;

a speech recognition portion that is capable of converting the human speech signal into a set of sub-words; and a progress meter portion capable of displaying a progress meter on the display proximate the volume meter, the progress meter being quantitatively indicative of the amount of progress of the speech recognition portion in converting the human speech signal.

30. The computer-readable medium of claim 29 wherein the volume meter portion comprises:

meter size computer-executable instructions capable of determining a maximum dimension for the volume meter;

volume ratio computer-executable instructions capable of calculating a volume ratio that is defined as a magnitude value associated with the human speech signal over a maximum possible magnitude value; and volume token computer-executable instructions capable of generating a volume token on the display that has a size that is determined from the volume ratio and the maximum dimension for the volume meter.

31. The computer-readable medium of claim 30 wherein the volume token computer-executable instructions comprise:

positive relation computer-executable instructions capable of generating a foreground portion of the volume token that is larger for higher magnitude values associated with the human speech signal; and negative relation computer-executable instructions capable of generating a background portion of the volume token that is smaller for higher magnitude values associated with the human speech signal.

32. The computer-readable medium of claim 31 wherein the progress meter portion comprises:

progress ratio computer-executable instructions capable of dividing a frame number representing the last frame of the human speech signal converted by the speech recognition system by a total frame number representing the total number of frames found in the human speech signal to produce a progress ratio;

meter dimension computer-executable instructions capable of determining a maximum dimension for the progress meter; and progress dimension computer-executable instructions capable of multiplying the progress ratio by the maximum dimension for the progress meter to produce a progress dimension.

33. The computer-readable medium of claim 32 wherein the volume token computer-executable instructions generate a volume token based in part on the progress dimension.

* * * * *